UNITED STATES PATENT OFFICE.

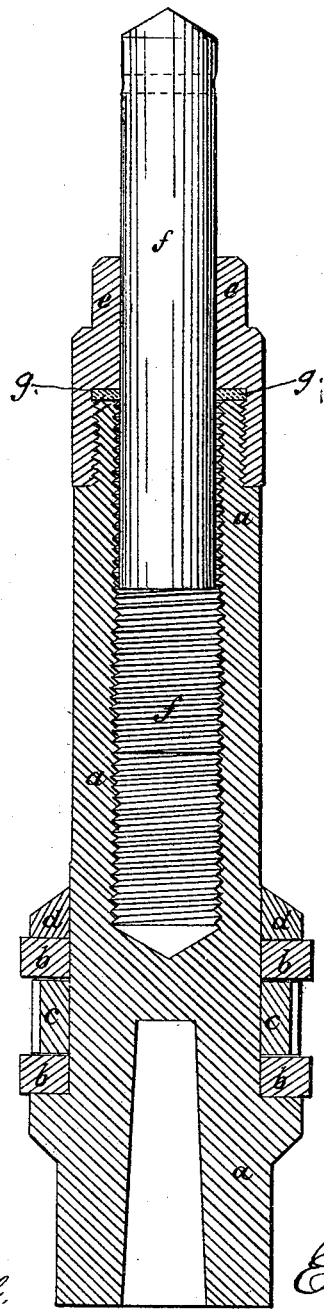

EDWARD H. ASHCROFT, OF LYNN, MASSACHUSETTS.

IMPROVED RATCHET-DRILL.

Specification forming part of Letters Patent No. 46,981, dated March 28, 1865.

*To all whom it may concern:*

Be it known that I, EDWARD H. ASHCROFT, of Lynn, county of Essex, and State of Massachusetts, have invented an Improvement in Ratchet-Drills; and I do hereby declare that the following, taken in connection with the drawings which accompany and form part of this specification, is a description of my invention sufficient to enable those skilled in the art to practice it.

My invention relates to detail of construction of ratchet-drills, being confined to that variety in which a nut-thread is formed within the body of the drill, in which thread a screw made on the end of the centering feeding-spindle can freely traverse a great portion of the length of the drill-body, giving thereby the feed movement to the drill.

My invention consists in the construction shown and described, whereby the centering and feeding spindle can be introduced into and removed from the body of the drill at its upper end and without disturbance of the handle, the drills, or the ratchet mechanism, the feed-spindle being exactly guided in the axial line of the drill by a collar (surrounding both the spindle and drill-body) being screwed to the latter, and having within itself around the spindle, and so as to be clamped on the end of the drill-body, a washer or packing of compressible material, by which dirt and dust are kept out of the threads of the nut and screw and from mingling with the lubricating-oil thereupon. By this construction a perfectly simple and effectual drill is made, in which the screw-threads by which the feed movement of the drill is produced are perfectly protected from injury by impact and from dust without employing the cumbersome and expensive system of cylindrical shells shown in the United States Patent No. 20,728. Said screw-threads are also easily got at, so that the old oil may be cleaned off without making the body of the drill in two pieces upon which come the stress of the power applied to turn the drill and the resistance to such turning, as in the construction shown in the United States Patent No. 43,109.

The drawing shows in vertical section a ratchet-drill embodying my invention. The section is not taken so as to show the handle and pawl of the drill, there being nothing new in their construction and arrangement or mode of operating them.

*a* is the drill-body; *b*, that part of the handle surrounding the body; *c*, the ratchet secured thereon; *d*, a removable collar, serving to confine the handle and ratchet in place on the drill-body. *e* is a cap, which is screwed on the upper end of the body *a*. *f* is a spindle centered in *a*, and has a screw-thread on its lower end fitting in the nut-threads formed in the body of *a*, as shown. *g* is a washer or packing, of compressible material, surrounding the spindle *f* within *e* and upon the upper end of *a*. The hole in *e* can be made to exactly fit the spindle *f*, and if wear enlarges the hole the compressible washer or packing *g* will be made to fit tightly around the spindle by screwing the cap *e* a little farther upon the body *a*. To oil the screw-threads, remove the cap *e* and drop the oil into the cavity in *a*. If the oil thickens, the spindle can be removed when the cap is taken off, and the threads of both nut and screw can be easily cleansed and freshly oiled.

In the Patent No. 43,109, above referred to, the construction differs materially from mine, in that the lower part of the drill stock or body which receives the drill is made removable for insertion of the feed-screw, such construction being objectionable not only because the drill and lower part of the stock are removed and the handle and ratchet mechanism disturbed or removed whenever the feed-screw has to be inserted in or withdrawn from the stock, but also because the stress of the work in turning and feeding the drill comes upon two parts united together by a screw-joint, whereas in my drill the whole drill stock or body upon which comes the strain is solid or of one piece of metal, while the extending screw is removed from the top of the stock with much greater facility than it could be from the bottom thereof, and without disturbance of the handle, drill, or ratchet mechanism, thus improving and perfecting the tool.

I am aware that the inventor of said patented drill made a drill or a model of a drill which had a removable cap, by which the extending screw could be put into and taken from the stock, but this drill-stock was made in two pieces between the cap and drill-socket, the lower piece being removable for insertion of the extending screw, or for other purposes, precisely as shown and described in the patent, whereas it is only to a drill-stock provided with a removable cap and extending screw, and made in one piece between the cap and drill-socket, that I claim as my invention, these parts never having had their relative construction before my invention, and in drill-stocks made in one piece there has been no provision for the removal of the extending screw at the top of the tool.

I claim—

In a ratchet-drill having a removable extending screw which works when the tool is in use in an opposite direction to the drill, making the drill in one piece between the removable cap and the drill-socket.

In witness whereof I have hereunto set my hand this 16th day of September, 1864.

EDWARD H. ASHCROFT.

In presence of—
J. B. CROSBY,
ALBERT F. HALL.